United States Patent [19]

Sennett

[11] Patent Number: 4,859,246
[45] Date of Patent: * Aug. 22, 1989

[54] USE OF HIGH MOLECULAR WEIGHT SULFONATE AS AUXILIARY DISPERSANTS FOR STRUCTURED KAOLINS

[75] Inventor: Paul Sennett, Colonia, N.J.

[73] Assignee: Engelhard Corporation, Menlo Park, N.J.

[*] Notice: The portion of the term of this patent subsequent to Sep. 20, 2005 has been disclaimed.

[21] Appl. No.: 244,535

[22] Filed: Sep. 12, 1988

Related U.S. Application Data

[63] Continuation of Ser. No. 40,918, Apr. 21, 1987, abandoned.

[51] Int. Cl.$^4$ ............... C08J 7/12; C09C 3/06; C09J 3/06; C04B 33/04
[52] U.S. Cl. .................. 106/487; 106/503; 106/505; 106/214; 501/146
[58] Field of Search ............ 106/487, 503, 505, 214; 501/146

[56] References Cited

U.S. PATENT DOCUMENTS

| | | |
|---|---|---|
| 3,519,454 | 7/1970 | Sawyer et al. ............ 106/288 B |
| 3,594,203 | 7/1971 | Sawyer et al. ............ 106/288 B |
| 3,736,165 | 5/1973 | Sawyer ............ 106/288 B |
| 4,075,030 | 2/1978 | Bundy et al. ............ 106/416 |
| 4,076,548 | 2/1978 | Bundy et al. ............ 106/486 |
| 4,078,941 | 3/1978 | Bundy et al. ............ 106/487 |
| 4,106,949 | 8/1978 | Malden ............ 106/288 B |
| 4,174,279 | 11/1979 | Clark et al. ............ 106/288 B |
| 4,272,297 | 7/1981 | Brooks ............ 106/214 |
| 4,738,726 | 4/1988 | Pratt et al. ............ 106/487 |
| 4,767,466 | 8/1988 | Nemeh et al. ............ 106/487 |
| 4,772,332 | 9/1988 | Nemeh et al. ............ 106/487 |

Primary Examiner—Paul Lieberman
Assistant Examiner—Helene Kirschner
Attorney, Agent, or Firm—Inez L. Moselle

[57] ABSTRACT

A bulked kaolin pigment is prepared by mixing a small but effective amount of a water-soluble cationic material such as a cationic polyelectrolyte flocculant with a kaolin clay pigment in the presence of water. The resultant bulked clay product can be dispersed to form high solids clay-water slurries useful in making aqueous coating colors suitable for manufacturing lightweight coated publication papers or the pigment can be used as a filler for paper webs. Slurries having stable viscosity during storage and at elevated temperature are prepared by using as the dispersant an anionic sulfonated disperant such as a lignosulfonate or a naphthalene formaldehyde sulfonate complex.

10 Claims, No Drawings

USE OF HIGH MOLECULAR WEIGHT SULFONATE AS AUXILIARY DISPERSANTS FOR STRUCTURED KAOLINS

This is a continuation of co-pending application Ser. No. 040,918 filed on 4/21/87 abandoned.

BACKGROUND OF THE INVENTION

This invention relates to improving the properties of pigments obtained by bulking kaolin clay by addition to the clay of a cationic material such as a polyamine or a quaternary ammonium polyelectrolyte. More specifically, the invention relates to remedying problems encountered when aqueous slurries containing such bulked pigments are stored or exposed to high temperature during storage, shipment, or use, for example when the slurries are prepared into coating colors in a steam jet cooker or when slurries are shipped and stored under high ambient temperatures.

Finely divided refined kaolin clay is widely used as a pigment to provide a glossy, white opaque surface finish on printing paper. The manufacture of refined kaolin pigments usually necessitates particle size fractionation and purifying crude clay while the clay is in the form of a fluid deflocculated aqueous slurry, bleaching the clay while in a flocculated state, filtering the flocculated clay to remove liquid water and then dispersing the flocculated clay in water to form a high solids slurry that is marketed as such or is dried, usually in a spray dryer, to provide a dry refined pigment capable of being mixed with water to form a dispersed fluid suspension. The latter form of clay is frequently referred to as a "predispersed" grade of clay even though the clay is dry and is not present in dispersed state until it is mixed with water.

Conventional kaolin clay pigments are applied as aqueous "coating colors" which comprise a clay pigment, a dispersing agent for the clay, a suitable adhesive such as a polymer latex, starch, or mixtures thereof and other minor additives. Present-day coatings are applied at high machine speeds which necessitate the use of high solids coating colors. The formulation of coating colors at high solids requires the initial provision of fluid high solids clay-water suspensions or "slips". These suspensions are subsequently mixed with adhesive dispersions or suspensions to prepare the coating colors. High solids clay-water suspensions of hydrous (uncalcined) clays generally contain in excess of 65% clay solids (65 parts by weight dry clay to 35 parts by weight water). Typically, solids are about 70%. A dispersing (deflocculating) agent, conventionally a sodium condensed phosphate salt, or sodium polyacrylate, is present in the high solids suspensions of conventional coating clays in order to impart fluidity, since the systems do not flow in the absence of the dispersing agent.

Such kaolin clay pigments must meet certain requirements with regard to rheological properties and to the properties of the coated sheet material. The viscosity of the high solids suspension of the clay coating pigment must be sufficiently low to permit mixing and pumping. After the adhesive is incorporated, the resulting coating color must also have suitable viscosity for handling and application to the paper sheet. In addition, it is highly desirable to obtain a coated calendered sheet which has good opacity, gloss, brightness and printability.

It is conventional practice in the art to improve the opacifying or hiding power of coating colors by blending the clay pigments with more costly pigments having greater opacifying power, such as $TiO_2$. The industry has long sought a kaolin clay pigment which imparts improved opacifying power to coated paper without sacrificing gloss and printability and which can preferably be used in the absence of other more expensive pigments.

High bulking clay pigments offer the opportunity of maintaining or improving the opacity, gloss and printability of coated paper at lower coating weights, thereby reducing the pigment cost for coating colors. Bulking pigments are those which provide coatings having high opacification at a low coat weight. Generally, bulking is achieved by introducing voids in a pigment structure which contribute to increased light scatter. Controlled calcination of kaolin clays results in one type of bulking clay pigment. Calcined bulked kaolin clay such as the material supplied under the registered trademark ANSILEX have enjoyed widespread commercial success for more than a decade. For many years attempts have been made to bulk hydrous kaolin clays, thereby avoiding the expense involved in calcining clay and also avoiding the increase in pigment abrasivity that appears to be an inherent result of calcination. U.S. Pat. Nos. 4,075,030; 4,076,548 and 4,078,941 teach procedures for increasing the opacifying power of hydrous kaolin clays by "selectively flocculating" ultrafine clay particles with a low molecular weight polyamine flocculating agent (e.g., ethylene diamine or hexamethylene diamine) or with long carbon chain amines or certain quaternary ammonium salts (e.g., "ditallowdimethyl" ammonium chloride) in the presence of a mineral acid flocculating agent, e.g., sulfuric acid, and optionally with the added presence of citric acid or mica or both. The selective flocculation treatment allegedly incorporates voids in the clay to form a low density, high bulking pigment which when used as a coating color pigment improves the opacity of paper coated therewith.

Efforts to introduce bulking pigments to the paper industry have been thwarted by the poor rheology of the pigments. Generally, paper makers seek to use clay coating pigments capable of forming high solids clay-water slurries which have a low shear viscosity below 1000 cp, preferably below 500 cp, when measured by the Brookfield viscometer at 20 rpm. High shear viscosity for these slurries should be such that they are no more viscous than a slurry having a Hercules endpoint viscosity of 500 rpm, preferably 800 rpm, using the "A" bob at $16 \times 10^5$ dyne-cm. Those skilled in the art are aware that when using the Hercules viscometer and measuring endpoints of 1100 rpm or higher, endpoint viscosities are reported in units of dyne-cm at 1100 rpm; apparent viscosity increases as the value for dyne-cm increases. It is conventional to use the abbreviated term "dyne". Thus, a "2 dyne" clay slurry is less viscous than a "9 dyne clay" slurry. As used hereinafter the expressions 500 rpm or higher, or 800 rpm or higher, are intended to include lower viscosities such that endpoint measurements are at 1100 rpm and the values are reported as dynes.

Another problem encountered in the successful commercialization of bulking pigments obtained from kaolin clay has been the difficulty of producing a bulked structure that is sufficiently durable to survive during various stages of production and end-use but is also capable of being dispersed to form high solids clay-water slurries having acceptable viscosity. When the general wet processing scheme described above is employed to make bulked structures by adding a bulking agent before filtration, the bulked structure must still be present in the filter cake containing the bulked assemblages when the filter cake is "made down" into a fluid slurry. The expressions "make down" and "made down" are conventional in the industry and refer to the preparation of dispersed pigment-water slurries. In some cases, it may be necessary to apply mechanical work to the filter cake to reduce the viscosity to usable values. The bulked structure must be sufficiently tenacious to survive the mechanical forces during such treatment. Bulking pigments must also be sufficiently stable under the influence of shear to maintain the bulked structure under the high shear rates encountered in pumping high solids clay water slurries. Moreover, a bulked structure must be capable of being retained when the deflocculated clay water slurry is formed into a coating color using standard makedown equipment. Also, the bulked structure must survive during the coating application and subsequent calendaring. The fragility of the bulked structures obtained by chemical treatments of hydrous clay has limited their commercial use. As mentioned, commercial bulking clays heretofore used by the paper industry have been those prepared by calcining fine particle size hydrous clays. In such case, calcination "sets" the bulked structure such that it is sufficiently durable to survive manufacturing, handling and use. Generally, a criterion for durability of a bulked structure is the retention of improved opacification (light scattering).

Copending patent application, Ser. No. 861,943, filed May 12, 1986, provides new relatively inexpensive kaolin pigments with a stable bulked structure but also capable of being mixed with water and dispersants to form clay-water slurries and coating colors having usable low and high shear viscosity. Although aqueous suspensions of such bulked clay contain added deflocculant to increase fluidity, these suspensions are not truly in deflocculated or dispersed condition because the bulked, flocced structure is retained. Thus, these slurries can be termed "partially deflocculated" or "partially dispersed" slurries or suspensions. The new bulked pigments, obtained using high charge density cationic polyelectrolytes to bulk the clay, can be applied to paper at low coat weights. Coated printing paper possessing superior printability, especially by rotogravure and offset methods has been obtained. However, slurries of the improved bulked pigments tend to increase in viscosity when exposed to high temperature, for example when prepared into starch coating colors by the known steam jet cooking procedure. Similarly, viscosity may increase slowly upon exposure to elevated storage temperature (e.g. 100° F.), over a period of several weeks. For example, a bulked pigment obtained by treating kaolin clay with cationic quaternary ammonium polymer (Calgon 261 LV) is dispersed in water with a polyacrylate or polyphosphate dispersant, as described in Ser. No. 861,943, and the "dispersed" aqueous slurry is heated, the clay-water slurry thickens at about 60° C. This occurs when such dispersants are either added to the washed filter cake obtained during processing or if the dispersants are added to previously spray dried bulked clay. It has also been found that slurries prepared by adding dispersant to conventionally washed (cold water) filter cakes of the new bulked pigments should be spray dried without aging the slurries for more than one or two days because high and low shear viscosity of spray dried pigments are adversely affected. When a hot wash is used, slurries can be aged for longer times, e.g., two weeks or longer without detriment to the viscosity of the pigment. By using a hot wash, pigments can be shipped in slurry form without an intermediate drying step. Such washing is not always feasible.

It has been observed that viscosity increase with storage is at least partially due to gel formation. In many cases the gel formed is of sufficient strength that the slurry cannot be poured from the container under the influence of gravity. If, however, the slurry is stirred, the gel breaks down and the slurry is of low viscosity and flows freely.

Since it is desired to be able to ship high solids slurries in tank cars, a high degree of fluidity is required. In many cases, slurry shipments must be sufficiently fluid to flow out of the tank car under the influence of gravity alone. Gel formation is undesirable in that it prevents this flow.

THE INVENTION

The present invention provides means for improving the properties of pigments obtained by bulking kaolin clay with cationic material such as polyamines or quaternary ammonium polyelectrolyte such that slurries of the pigments or coating colors containing such pigments have improved stability at elevated temperatures and more stable viscosity on storage.

It has now been found that when high molecular weight anionic sulfonate dispersants are added to pigments prepared by treating kaolin clay with a cationic material such as a cationic polyelectrolyte to produce a bulked pigment, aqueous slurries of the pigment can be stored for an extended period of time e.g., 18 days at 140° F., without undue viscosity increase. These same treating agents also increase the temperature at which the clay slurry thickens, thus allowing steam jet cooking. It has also been found that these same sulfonate dispersants lower the viscosity of coating colors and give increased resistance to viscosity increase caused by soluble salts. Lignosulfonates (exemplified by LIGNOSITE 458, and DYQEX supplied by Georgia Pacific Corporation and naphthalene formaldehyde sulfonate complex (exemplified by LOMAR D supplied by Diamond Shamrock Chemicals Company) have been found to be particularly effective.

It has also been observed that residues from the bleaching operation carried out with hydrosulfite salts lower the thermal thickening temperature, increase the viscosity and lessen the storage stability. It appears that higher bleach levels actually decrease Brookfield viscosity and increase thermal thickening temperature provided that the filter cake is well washed.

The anionic dispersant containing sulfonate groups may be added to cationically bulked kaolin clay by modification of the procedures described in Ser. No. 861,943 such that the sulfonate is added when the filter cake is reslurried. Alternatively, the sulfonate can be added to dry previously bulked clay. The sulfonate can be used as the sole dispersant or it can be used with another dispersant, preferably an anionic polyacrylate salt such as a sodium polyacrylate.

When a sulfonate dispersant is added to a filter cake obtained by bulking kaolin clay with a cationic polyelectrolyte to fluidize the clay and form a slurry, the heat resistivity of the slurry increases markedly with a minimal effect of the performance properties of the bulked clay pigment or the viscosity of the clay water slurry.

Similar resistivity improvements in heat stability are obtained if the slurry containing added sulfonate dispersant is spray dried and then redispersed in water. Gelation is also minimized or avoided.

The proportion of dispersant in the novel mixture with cationically bulked clay is not narrowly critical and can range from about 0.05% to 0.25% on dry clay basis and preferably 0.1% to 0.15%. When too much sulfonate dispersant is used the viscosity increases, both initially and on storage; when insufficient sulfonate is employed viscosity increases on storage. When employed in combination with a polyacrylate dispersant, the amount of polyacrylate can range from 0.05% to 0.3% on dry clay basis, and preferably 0.1% to 0.175%.

I have found that the dispersant employed to obtain the desirable combination of benefits, namely improved viscosity stability on storage, minimized sensitivity to the presence of soluble salts in slurries and coating colors, and ability of slurries and coating colors to resist thickening when heated, require the use of a water soluble dispersant having a sulfonate group and also having a high molecular weight, above 100. I have carried out tests using other anionic dispersant, namely sodium polyacrylate, sodium diglycolate, sodium laurates, sodium dodecyl sulfate and disodium benzene sulfonate. The desirable results observed when using sulfonate dispersants were not realized. For example, when disodium dodecyl sulfate was used, the thermal thickening temperature was raised only a few degrees.

DETAILED DESCRIPTION

Preparation of Preferred Bulked Pigments (Ser. No. 861,943)

It has been determined that the shape of the particle size distribution curve of the kaolin clay used to produce pigments of the invention has an effect on the ultimate coating properties of the polyelectrolyte treated kaolin clay mineral. Thus, a clay having the following particle size distribution characteristics has been found to provide optimum viscosity and coating properties: a median practice size of 0.55 micrometers and a particle size distribution such that about 88±2% of the particles have an equivalent spherical diameter less than about 2 micrometers and not more than about 25% by weight, preferably not more than about 20% by weight, have an equivalent spherical diameter less than 0.3 micrometers. If the particle size is too coarse, gloss and opacity suffer although opacity will be greater than the clay before treatment with polyelectrolyte. If the quantity of ultrafine particles, i.e., particles 0.3 micrometers and finer, is too great, the viscosity of the pigment may be such that it has limited, if any, use.

In order to achieve the desired particle size distribution of the kaolin that is eventually formed into a bulked structure, it is generally necessary to perform one or more particle size separations on the crude clay. Generally, such processing includes degritting, followed by differential gravitational or centrifugal sedimentation to recover a size fraction of desired particle size, such as for example, a fraction that is 90% by weight finer than 2 micrometers and does not contain an excessive amount of ultrafine particles. The content of ultrafines and median (weight) particle size of such fraction will vary, depending on the particle size distribution of the crude clay. In order to perform these operations successfully, it is essential that the clay be present in the form of discrete particles in water rather than flocs so that the particles can be accurately separated into different size ranges. The clay particles are therefore treated with a deflocculant (dispersing agent) which will give all the particles a negative electric charge, and cause them to repel each other when the particles are suspended in water. The clay dispersant used at this stage is generally referred to as a "primary" dispersant. Dispersants used to deflocculate suspensions of previously processed clay (such as dispersants added to filter cakes) are termed "secondary" dispersants or deflocculants. Suitable dispersing agents used for primary dispersion in practice of the present are conventional and include water soluble salts of condensed phosphate, such as a pyrophosphate, e.g., tetrasodium polysilicic acid, for example, sodium silicate, or a water soluble organic polymeric dispersing agent, for example a polyacrylate or a polymethylemethacrylate salt having a molecular weight in the range of about 500 to about 10,000. The amount of dispersing agent used will generally be in the range of from about 0.025 to 0.2% by weight based on the weight of the dry clay. Generally, particle size separations are performed using deflocculated aqueous suspensions have a solids content of about 20–40% by weight. Other solids levels may be used to carry out such separations. The median particle size of the clay particles that are treated with the cationic polyelectrolyte should range from 0.4 to 0.7 micrometers, equivalent spherical diameter (e.s.d.), preferably 0.5 to 0.6 micrometers, as determined by conventional sedimentation techniques using the SEDIGRAPH ® particle size analyzer, supplied by Micrometrics, Inc. From about 80% to 95% by weight of the particles should be finer than 2 micrometers, e.s.d. The content of fines below 0.3 micrometer e.s.d. should be below 35 weight percent, preferably below 25 weight percent, and most preferably 20 weight percent or below. It should be understood that the measurements of the size of clay particles that are 0.3 micrometer or finer are of limited reproduceability. Thus, when a SEDIGRAPH analyzer is employed, the value for weight percent may be ±5% when tested by another operator or a different SEDIGRAPH analyzer is employed. Most preferably, median particle size is 0.6±0.05 micrometers, e.s.d., with 85 to 90% by weight of the particles finer than 2 micrometers, e.s.d., and less than about 20% by weight or less finer than 0.30 micrometers, e.s.d. Present experience indicates that when the clay to which polyelectrolyte is added contains an excessive amount of ultrafine particles (particles 0.3 micrometers or finer), the Brookfield viscosity may be higher than and Hercules viscosity lower than bulked pigments obtained from clays with a smaller amount of ultrafine particle. One trial resulted in a failure because of excessively high low shear viscosity of the product when the feed clay contained more than the desired amount of particles finer than 0.3 micrometers. Blending of clay fractions may be advantageous or necessary with some crudes to provide a clay feed having a desirable particle size distribution.

The amount of polyelectrolyte employed is carefully controlled to be sufficient to improve the opacity of the clay as a result of forming a bulked (aggregated) structure in which the aggregates are sufficiently strong to survive mechanical forces exerted during manufacture and end use but is carefully limited so as to assure that the product can be formed into a clay-water slurry that has a solids content of 60% or higher, which slurry has acceptable rheology.

The amount of the cationic polyelectrolyte salt used to treat the kaolin clay may vary with characteristics of the polyelectrolyte including charge density of the polyelectrolyte, the particle size distribution of the clay and solids content of the clay slurry to which the polyelectrolyte is added. Using the presently preferred dimethyldiallyl ammonium salt polyelectrolyte with clay having a medium size in the range of about 0.5 to 0.6 micrometers, and having less than 20% finer than 0.3 micrometers and adding polyelectrolyte to a previously deflocculated clay-water suspension having a clay solids content of about 20–40% by weight, useful amounts range from about 0.03 to about 0.15% by weight of the moisture free weight of the clay, most preferably about 0.07 to about 0.1% by weight. When insufficient polyelectrolyte is used, the effect on opacity and printability in coating applications may be less than desired. On the other hand, an excessive amount of the polyelectrolyte may impair other desired properties for the clay, especially rheology.

The polyelectrolyte, which is water soluble, is added to the slurry as a dilute aqueous solution, e.g. $\frac{1}{4}$–2% concentration on a weight basis, with agitation to achieve good distribution in the slurry. Ambient temperature can be used. It may be advantageous to heat the slurry of clay, solution of polyelectrolyte, or both to about 150° to 180° F. The cationic polyelectrolyte flocculants that are used have closely spaced charged centers and therefore represent high charge density material. Because of this, the reaction with the clay mineral is extremely rapid and appears to be complete in a relatively short time. While not wishing to be limited by any particulars of the reaction mechanisms, it is believed that the clay mineral cations such as $H^+$, $Na^+$, and $Ca^{++}$ are replaced with the positively charged polymeric portion of the cationic polyelectrolyte at the original mineral cation location and that this replacement reduces the negative charge on the clay particles which in turn leads to coalescence by mutual attraction. Charge centers near the end of the polymer chain react and bridge with neighboring particles until the accessible clay cation exchange centers or the polymer charge centers are exhausted. The bridging strengthens the bond between the particles, thereby providing a highly shear resistant, bulked clay mineral composition. The presence of chloride ions in the filtrate in the case of dimethyldiallyl ammonium chloride may be an indication that at least one stage of the reaction between clay particles and quaternary salt polymer occurs by an ion-exchange mechanism. The amount of polyelectrolyte added is less than that calculated to provide a monolayer on the surface of clay particles. Present experience based on measurements of particle charge by electrophoretic mobility indicates that the bulked clay does not have a cationic charge.

Water soluble cationic polyelectrolyte flocculants are well known in the art and many are known to increase the rate at which clay slurries filter. See, for example, U.S. Pat. No. 4,174,279. Cationic polyelectrolyte flocculants are characterized by a high density of positive charge. Positive charge density is calculated by dividing the total number of positive charges per molecule by the molecular weight. Generally the high charge density of polyelectrolyte flocculants exceeds $1 \times 10^{-3}$ and such materials do not contain negative groups such as carboxyl or carbonyl groups. In addition to the alkyl diallyl quaternary ammonium salts, other quaternary ammonium cationic flocculants are obtained by copolymerizing aliphatic secondary amines with epichlorohydrin. See U.S. Pat. No. 4,174,279. Still other water-soluble cationic polyelectrolyte are poly (quaternary ammonium) polyether salts that contain quaternary nitrogen in a polymeric backbone and are chain extended by either groups. They are prepared from water-soluble poly (quaternary ammonium salts) containing pendant hydroxyl groups and bifunctionally reactive chain extending agents; such polyelectrolytes are prepared by treating an N, N, N(1), N(1) tetraalklhydroxyalkylenediamine and an organic dihalide such as dihydroalkane or a dihaloether with an epoxy haloalkane. Such polyelectrolytes and their use in flocculating clay are disclosed in U.S. Pat. No. 3,663,461. Other water soluble cationic polyelectrolyte flocculants are polyamines. Polyamine flocculants are usually supplied commercially under trade designations and chemical structure and molecular weight are not provided by the suppliers.

A dimethyl diallyl quaternary ammonium chloride polymer commercially available under the trademark designation Polymer 261 LV from the Calgon Corporation having a molecular weight estimated to be between 50,000–250,000 has been found particularly useful in the practice of the present invention and has FDA approval (Code 176-170) for use in paper and board that comes in contact with aqueous and fatty foods. Many reagents heretofore proposed to bulk clay do not have FDA approval. However, the invention is not limited to Polymer 261 LV since other cationic flocculants appear to provide equivalent, if not superior results.

Limited experimental work with kaolin clay that produce desired results using 0.08% Calgon 261 LV polymer (dimethyl diallyl ammonium chloride, said by the supplier to have a molecular weight between 50,000 and 250,000) indicates that similar results would be expected with water-soluble cationic flocculants supplied with the following trademarks when used in the quantities indicated (100% active weight basis): NALCOLYTE ® 7107 (0.025%), NALCLEAR ® 7122 (1.00%), NALCOLYTE ® 8102, (0.50%), NALCOLYTE ® 8101 (1.0%), NALCOLYTE ® 8100 (1.0%). Information from the suppliers indicates that these polyelectrolytes are quaternary, low molecular weight.

NALCOLYTE 8101 —Aqueous solution of polyquaternaryamine chloride, moderate molecular weight.

NALCOLYTE 7107 —Aqueous solution of polyamine, low molecular weight.

NALCOLYTE 8100 —Aqueous solution of quaternary polyamine, moderate molecular weight.

The exact structural formula of the preferred diallyl polymers has not been completely delineated. It is believed that either of the two ring structures set forth below could represent the structure,

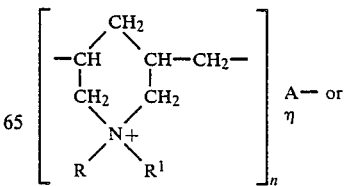

-continued

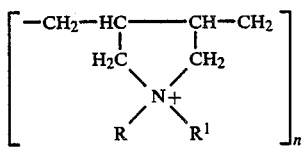

wherein: R and $R_1$ are selected for hydrogen or an alkyl group of 1–18 carbon atoms, n indicates repeating units, and $A^-$ is an anion such as $Cl^-$. The preferred compounds are dialkyl diallyl quaternary ammonium salt polymers which contain alkyl groups R and $R_1$ of 1–4 carbon atoms, preferably methyl, and n is an integer of 5 to 1,000. Such polyelectrolytes are known flocculating agents. For example, U.S. Pat. Nos. 3,994,806 and 4,450,092 disclose the use of dimethyl diallyl ammonium chloride salt polymers in combination with aluminum and iron salts or a polyacrylamide in coagulating finely divided solids in turbid waters. It should be understood that incorporation of other anions in place of chloride ion is possible, although performance could be affected. Examples of such other anions are acetate, sulfate, nitrate and hydroxide.

Satisfactory results have been realized when the polyelectrolyte was added to deflocculated clay suspensions having pH values in the range of 6 to 9. After addition of polyelectrolyte, the suspension is substantially thickened as a result of flocculation. The resulting thickened system is then acidified, typically to a pH below 5, usually pH 3–4, and bleached using a conventional clay bleach (hydrosulfite salt such as sodium hydrosulfite) and then at least partially dewatered to remove free water and place the recovered bulked clay in a form such that it can be washed to remove ions in the flocculated clay suspension. Normally dewatering is carried out on a filter, for example a rotary vacuum filter.

Bleaches are usually reductants which reduce any color forming ferric iron ($Fe^{3+}$) constituents to a more water soluble and therefore more easily removable ferrous state ($Fe^{2+}$). Suitable bleaching agents include water soluble hydrosulfite salts, and borohydride salts which are advantageously added to the clay mineral slurry in an amount in the range of from 1 to 15 lbs., most preferably about 2 to 6 lbs., of bleaching agent per ton of dry clay. The slurry of polymer treated clay is acidified before filtration in order to enhance filtration even if bleaching is not carried out. Viscosity stability of bulked kaolin products are poor unless bleach residues are removed by washing or sulfonates are used as dispersants.

The clay suspension is dewatered by filtering to a moist filter cake having a solids content of between about 50 to about 60% by weight. The filter cake is then washed to remove soluble material and then fluidized by the addition of a secondary dispersing agent which in accordance with this invention, comprises an anionic sulfonate surfactant dispersant is added to the filter cake at a concentration of about 0.01 to about 1.0 percent by weight based on the dry clay solids including the cationic flocculant and preferably about 0.05 to about 0.15 percent by weight. The pH is usually kept between 6.0 and 7.5.

The presence of the cationic polyelectrolyte significantly improves the rate of dewatering that can be achieved with conventional filtration equipment (e.g., a rotary vacuum filter) during the processing of the pigment. Thus, the presence of polyelectrolyte during filtration decreases filtration costs, and the increased filtration rate compensates in part for the cost of the cationic polyelectrolyte. It should be noted that the amount of polyelectrolyte used in practice of the present invention is not selected to maximize settling or filtration rates since in practice of the invention the bulked structure must be capable of being formed to clay-water system having usable viscosity after addition of a suitable quantity of deflocculating agent. In some cases, it will be necessary during manufacture to apply mechanical work to the bulked clay in the filter cake while adding a deflocculating agent in order to obtain a desired low viscosity. Filter cake solids vary with the equipment used and the level of vacuum applied. Solids also vary with the particle size characteristic of the clay. Generally, addition of polyelectrolyte flocculant usually decreases the solids content of the filter cake. The filter cake is washed with water to remove soluble matter. It has been found that use of hot water, e.g., water having a temperature above 100° F. and below the boiling point is beneficial. Use of hot wash has resulted in products having a lower Brookfield viscosity than was obtained when wash water was at ambient temperature. The use of a hot wash results in filter cakes having a reduced content of salts. For example, filter cakes having specific resistances ranging from about 13,000 to 50,000 ohm-cm resulted from washes at 120°–140° F. while unheated water in similar amount resulted in cakes having specific resistances of about 6000 ohm-cm.

In some cases, it is necessary to increase the solids of the filter cake to realize the desired reduction in Brookfield viscosity of the product, especially when the work input during blunging is low. For example, in the case of one bulked clay which produced a filter cake having solids content of 55%, the desired reduction in viscosity necessitated addition of dry clay to build up to a solid content of 59% prior to spray drying before the mechanical work was effective.

The dewatered and washed filter cake may be fluidized by adding a deflocculant and supplied for shipment in slurry form as mentioned above. Alternately, the filter cake can be fluidized by addition of a deflocculant and then spray dried to produce a dry so-called "predispersed" product in dustless form.

The amount of deflocculating (dispersing) agent used to fluidize the washed filter cake is typically less than conventionally used for secondary dispersion. Thus, secondary dispersant (anionic sulfonate alone or in combination with sodium polyacrylate) is generally used with coating grades of clay in amounts in the range of about 0.15% to .25% based on the dry clay weight. Dispersant levels much greater than 0.3% have been found to convert low viscosity slips of clays bulked by this invention to slips having high viscosity. After addition of dispersing agent, the filter cake is then subjected to controlled agitation to redisperse the clay particles.

The resultant bulked polyelectrolyte treated clay product, after addition of a clay deflocculation agent, is used to form high solids (at least 60% clay solids) suspensions in water. These suspensions are then formed into aqueous coating colors suitable for applying on paper. Alternatively, the bulked product may be used as a filler for paper webs.

The kaolin clay pigments bulked in accordance with practice of the present invention are especially useful in preparing coating colors for coating lightweight publication papers, particularly magazine stock, to achieve coated papers having excellent opacity and printability. Coat weights of light weight coated publication papers are usually in the range of 3 to 7 lbs/3000 ft$^2$. The printability and opacity are generally at least equal (and usually superior) to that achieved by the commercially used blend of delaminated kaolin clay and calcined kaolin clay.

Typical pigments of the invention have the following properties:

| | |
|---|---|
| G.E. Brightness, % | At least 85 |
| +325 mesh residue, wt % | Less than 0.001 |
| Particle size | |
| % Finer than 2 micrometers | At least 80%, |
| Average size, micrometer | 0.6–0.8 |
| Scattering coefficient, m$^2$/g | |
| @ 457 nm | At least 0.15 |
| @ 577 nm | At least 0.11 |
| Brookfield Viscosity of 62% solids slurry, cp | |
| @ 20 rpm | Below 1000 cp, preferably below 500 cp, most preferably 300 cp. |
| @ 100 rpm | No greater than at 20 rpm |
| Hercules end going "A" bob viscosity (rpm/dyne-cm × 10$^5$) | Above 800 rpm, preferably above 500 rpm and, most preferably, no more than 16 × 10$^5$ dynes at 1100 rpm. |

Bulked clay pigments of the invention appears to possess adequate shear stability to survive production and handling conditions such as described above, using conventional commercial processing equipment and also are sufficiently stable for use in high speed coaters used by paper industry.

In preparing coating colors, conventional adhesives or mixtures of adhesives are used with the deflocculated clay slip. For example, useful coating color compositions are obtained by thoroughly mixing with the clay slip from about 5 to about 20 parts by weight adhesive per 100 parts by weight of polyelectrolyte treated clay. Such a coating color, when used for coating lightweight publication paper, produces a product which has excellent opacity, gloss and printability.

The term "adhesive" as used herein refers to those materials known for use in connection with paper pigment, which aid in binding the pigment particles together and, in turn, binding the coating to the paper surface. Such materials include, for example, casein, soybean proteins, starches (dextrins, oxidized starches, enzyme-converted starches, hydroxylated starches), animal glue, polyvinyl alcohol rubber latices, styrene-butadiene copolymer latex and synthetic polymeric resin emulsions such as derived from acrylic and vinyl acetates. When the adhesive comprises a starch which is jet cooked in the presence of added bulking pigment, we believe the use of an anionic sulfonate surfactant alone or mixed with sodium polyacrylate will permit the steam jet cooking of this mixture and will avoid the development of extremely viscous, unworkable coating colors. Steam jet cooking of a coating color composition is described on a Canadian Pat. No. 1,140,332. Typical temperatures are 225°–325° F.

The coating color compositions prepared in accordance with the present invention can be applied to paper sheets in a conventional manner.

All particle sizes used in the specification and claims are determined with the SEDIGRAPH ® 5000 particle size analyzer and are reported as equivalent spherical diameters (e.s.d.) on a weight percentage basis.

In the examples, test results were obtained by the following TAPPI (Technical Association of the Pulp and Paper Industry) produces for paper:

75° gloss—TAPPI Standard T480 ts-65. Value denotes the evenness or smoothness with which a coating lays on the surface of paper.

B & L opacity—TAPPI Standard T425-M-60

G. E. brightness—TAPPI Standard T425-M-58

Furthermore, light scattering and gloss of pigments were determined in some instances. This was done by coating the kaolin clay suspensions onto black glass plates at a coat weight of 7.0–14.0 g/m$^2$ (expressed as dry clay). The reflectance of the coatings after drying in air at wavelengths 457 nm and 577 nm is measured by means of an Elrepho reflectometer. The reflectance values are converted by the use of Kubelka-Munk equations to light scattering values (m$^2$/g). The light scattering values are a measure of the opacity potential of the clay because the higher values indicate that light rather than passing through is reflected and scattered back. The higher the light scattering value, the higher the opacity potential of the clay. Reflectance is measured at two different wavelengths. The 457 nm wavelength corresponds to the wavelength used in the TAPPI brightness measurement and the 577 nm wavelength to that used to measure opacity.

In preparing slurries for measurement of high shear (Hercules) and low shear (Brookfield) viscosity, Engelhard Corporation procedure PL-1 was used. Brookfield viscosity was measured using TAPPI procedure T648 om-81 at 20 rpm using the 1 or 2 spindle; in some cases Brookfield viscosity was measured at 100 rpm using the 3 spindle. All slurries were formulated with optimum amount of dispersant, following the PL-3 procedure of Engelhard Corporation. Following are descriptions of PL-1 and PL-3 procedures.

PL-1 is the standard laboratory makedown method for hydrous clays at 70% solids under high shear conditions. Hydrous clays may also be madedown at other solids such as 68% solids for delaminated clays utilizing this procedure and adjusting the amount of water needed.

Equipment and Material

Analytical balance
Aluminum tins for weighing
Electric, forced air oven
Laboratory balance, accuracy ±0.1 grams
Waring Blendor ® mixer (belt driven by ¾ HP motor, with pulley to provide 10,500 RPM).
1000 ml and 600 ml unbreakable beakers
500 grams oven dry clay
214 grams deionized water
Dispersant (as required, i.e., tetra sodium pyrophosphate (TSPP) or organic such as Colloids 211

Procedure for Preparation of 70% Solids Clay Slurry

A. Formulation for 70% solids clay slurry

| | |
|---|---|
| Deionized Water | 214.0 gms |
| Mineral (O. D.) | 500.0 gms |
| Total . . . | 714.0 gms |

B. Determine the moisture content of the mineral to be used by drying a 3 gram sample in the oven for 30 minutes at 220° F. and cooling in a dessicator for 15 minutes before reweighing.

C. Place 214 grams of distilled water in the Waring Blendor (subtract moisture in clay from 214 grams). If a dispersant is to be used, add it to the water and mix in the blendor for 30 seconds.

D. Weigh the oven dry equivalent of 500 grams of clay into a tared beaker. Add the 500 grams of clay to the water using a small scoop. After the addition of each scoop of clay to the water, "jog" the switch on the motor "off" and "on" momentarily to disperse the clay into the water. Do not allow the motor to attain full speed during the incorporation of the clay into the water. Only allow the blendor to come to full speed after all the dry clay has been added. Excessive additional shear on the clay/water slip (particularly in the case of delaminated clays) will effect the reproducibility of rheological measurements on a given sample.

E. When all the clay has been added to the water, scrape the clay on the sides of the blendor into the slurry with a spatula. Let the slip mix under full agitation for 60 seconds.

F. Transfer the slip to a tared 600 ml unbreakable beaker and cap tightly to prevent evaporation of water. (Aluminum foil provides a good "capping" material).

G. Cool the clay slip to 80° F. and determine the final solids content. The solids should be within ±0.2% or adjustment is necessary. Adjustment can be made if the percent solids is too high by the addition of water. However, if the percent solids is too low, the slip will have to be discarded and a new one made.

H. Rheological properties of the slip should be measured and recorded in accordance with standard methods.

Procedure for Determining Maximum Slurry Solids

Maximum slurry solids is dependent on optimum dispersion. Therefore, the attainment of maximum solids requires prior knowledge of the optimum dispersant demand for the particular pigment under investigation. Follow PL-3, described hereinafter, for determining the optimum dispersant level before proceeding with the following steps.

A. Follow the procedure outlined in steps C through G for the preparation of a 70% solids slurry, employing the previously determined optimum dispersant level (with some clays it may be necessary to start at slightly lower solids levels to produce a flowable mixture at optimum dispersant levels).

B. Add an additional quantity of clay until a non-flowable mixture is produced by the blender.

C. Add additional dry dispersant such as TSPP at the rate of 0.30% on the weight of the additional clay added in step B. Mix for 5 seconds.

D. The slurry should fluidize with the addition of the dispersant. Repeat steps B and C until the slurry no longer fluidifies after the dispersant addition.

E. The solids content at this point is recorded as maximum operable solids for this clay.

This method determines the amount of dispersant to obtain minimum viscosity of clay.

Optimum dispersions determined by the PL-3 procedure which involves making small additions of dispersant to a slurry, mixing and then determining the Hercules and Brookfield viscosity. The dispersant level before the viscosity increases (becomes poorer) is the optimum dispersant level. The optimum dispersant level for Hercules viscosity may be different than the optimum Brookfield viscosity and therefore Hercules or Brookfield optimum should be specified.

Equipment

Modified Waring Blendor ® mixer (calendering drives by ¾ HP motor, with pully to provide 10, 500 RPM)
Hercules Viscometer
Brookfield Viscometer
Talboy variable speed mixer
Constant temperature bath
Laboratory balance (0–10 grams)
Deionized water
Pigment (500 oven dried grams or 250 grams for calcined clay)
Dispersant (inorganic or organic)
Electric, forced air oven at 105°±3° C.

Procedure

Prepare hydrous kaolin by PL-1 method (supra). Add no dispersant for predispersed clay and minimum amount (about 0.2%) of dispersant for pulverized clay.

B. Determine the percent solids of the sample by drying part of the sample in an oven. Solids should be 70±0.2% for hydrous clay, 68±0.2% for delaminated clay, 50±0.2% for calcined clay and other solids as required.

C. Determine the Brookfield viscosity and Hercules viscosity of the sample.

D. While mixing the sample using the Talboy mixer, add 0.05% dispersant based on pigment weight and continue mixing for five minutes.

E. Determine the Brookfield viscosity and Hercules viscosity.

F. Repeat D and E until the viscosity increases (becomes poorer).

G. Optimum viscosity is the amount of dispersant added before the viscosity increases or there is no viscosity change. The solids, dispersant level and Brookfield and Hercules viscosity are reported at optimum viscosity.

Hercules viscosity values reported herein were measured with Hercules Hi-Lo Shear Viscometers, Model ET-24-6. These instruments are equipped with a cup to contain the sample fluid and are supplied with a series of rotating bobs and spring sets which provides a variety of shear rate conditions. One Hercules viscometer was equipped with the "A" bob and was employed to operate with the 100,000 dyne cm/cm spring up to 1100 rpm for clay water slurries; the other was set to operate with a 400,000 dyne cm/cm spring up to 4400 rpm to measure viscosity of coating colors.

Following are details of the "A" and "E" bobs.

| Bob | Bob Height | Bob Radius | Cup-Bob Clearance | S Value | Max. Shear Rate @ 4400 rpm | Shear Rate Factor (Factor × rpm) = Shear Rate |
|---|---|---|---|---|---|---|
| A | 5.0 cm | 1.95 cm | 0.05 cm | 0.00020 | 18196 sec.[1] | 4.14 |

-continued

| Bob | Bob Height | Bob Radius | Cup-Bob Clearance | S Value | Max. Shear Rate @ 4400 rpm | Shear Rate Factor (Factor × rpm) = Shear Rate |
|---|---|---|---|---|---|---|
| E | 5.0 | 1.98 | 0.02 | 0.00008 | 45900 | 10.42 |

TAPPI Procedure T648 om-81 gives further description of the procedures used to measure high shear viscosity. It is common to report high shear viscosity of clay-water as either dyne-cm $\times 10^5$ torque at 1100 rpm bob speed or as bob speed in rpm at which the maximum torque of $16 \times 10^5$ dyne-cm was obtained. Similarly, $10^5$ torque at 1100 rpm bob speed or as bob speed in rpm at which the maximum torque of $16 \times 10^5$ dyne-cm was obtained,. Similarly, the coating color viscosity is reported as either dyne-cm $\times 10^5$ torque at 4400 rpm bob speed or as bob speed in rpm at which the maximum torque of $64 \times 10^5$ dyne-cm was obtained.

Viscometers were operated in the manner summarized below:

1. Set the graph and pen in place on the recording drum (pen is placed on origin on graph paper).
2. Remove the cup and bob from the water bath at 80° F. and dry.
3. Pour 28±2 cc of the fluid to be tested into the cup and set in place on the viscometer. Use of a syringe will frequently facilitate filling the cup.
4. Attach the bob by rotating it counter-clockwise making it only finger tight, then immerse it in the fluid cup to its limit. The fluid should come up to the top of the bob. If not, then more fluid must be added until it covers the bob.
5. Start the viscometer motor (lower left front of viscometer).
6. Press the "AUTO" switch on the control panel. The pen will proceed to draw a graph of shear rate versus shear force (torque). If the viscometer reaches its maximum rpm setpoint, the pen will automatically return to its starting going. However, if the pen goes beyond the maximum allowable torque before reaching maximum rpm, the viscometer will automatically shutdown and the recording drum will have to be returned to its original position using the crank handle.

The precision is based on a dyne-cm $\times 10^5$ reading at 1100 rpm and rpm reading at 16 dyne-cm $\times 10^5$ because these are the values reported for products. The 95% confidence level for the precision for three operations at two different viscosities follows:

| Average | Precision |
|---|---|
| 4.4 dyne-cm × $10^5$ at 1100 rpm | 16.8% |
| 500 rpm at 16 dyne-cm × $10^5$ | 21.4% |

In measuring printing properties by the so-called 75° Gloss Ink Holdout Test, the procedure used was one described in a publication by Otto P. Berberich, TESTING PRINTABILITY OF PAPER AND BOARD WITH INK—III, November 1957 IPI. The procedure gives results relative to the printing qualities on a letter press proofpress using halftone printing plates.

The K & N Ink Holdout Test entails applying an excess of heavy bodied black pigmented printing ink to coated paper, removing the excess and ascertaining the contrast between the image and the background.

In measuring printability of the paper coated with the coating color, the Helio test was used. This test is widely used to evaluate printability by the gravure method. In the test, the coated sheet is printed with a gravure cylinder, which has a pattern of ink holding cavities that decrease in diameter from one end to the other. Thus the test print has large dots at one end and small ones at the other. Skipped dots are counted starting at the large-dot end, and the print quality is reported as the distance in millimeters from the start of the test print to the 20th missing dot. For a given coat weight, the longer the distance in millimeters the better the printability of the coated paper.

The examples describe results for making down slurries of experimental and control pigments using laboratory and pilot plant procedures. In the laboratory procedure, Waring Blendor ® mixer Model 31 BL 46 was used with a 40 oz. blender jar and cover and a Variac power supply control. An amount of dispersant (typically 0.25% Colloid 211 or 0.25% TSPP based on the dry weight of the pigment) is dissolved in water calculated to provide a 62.0–62.5% solids slurry containing 300 g. of pigment. Three hundred (300) g of pigment was added gradually at moderate speed. When all of the pigment was added, the blender was run for one minute at 50 volt Variac setting. Pilot plant makedown was performed with a Cowles mixer (10" vessel dia, 4" blade dia, 3300 rpm blade speed, 3455 ft/min tip speed). Dispersant was added to water, followed by addition of pigment to water, as in the laboratory procedure, and mixed at slow speed. The mixer was then run at 3300 rpm for 5 minutes.

Effect of Aging Temperature

Clay slurries are conventionally evaluated for viscosity stability on storage by determining the viscosity change with time for samples stored at 110° F. in a shaker-type water bath that provides gentle back-and-forth agitation. Presumably samples that stay fluid for 6 to 8 weeks are sufficiently viscosity stable for slurry shipment. As a cautionary note, laboratory studies show that the 110 degree shaker bath aging can actually accelerate gel formation. Several samples have shown significantly greater gel formation after 1 week in the shaker bath than after 1 weeks static aging at the higher temperature. It has been previously reported in the literature that rhythmic vibrations can accelerate gel formation in some colloidal systems. More rapid bacteria growth at 110° F. could also be a factor. An alternative, more rapid, method was used in illustration examples.

Gel Strength

I have observed that gel formation, not just viscosity increase, was a major problem in storage stability. Various techniques were investigated as methods of determination of gel strength.

1. Yield point using the Stormer viscometer

It was found that an apparent yield point could be measured using the Stormer viscometer. The procedure used was to equip the viscometer with the paddle-type measuring head (used to measure Krebs viscosity in paints), immerse the measuring head in undisturbed slurry, and then add weights to the drive mechanism until the measuring head started to turn. The weight required to start the paddle in motion is a measure of gel strength, larger weights denoting stronger gels. Typical values obtained using completely ungelled samples were around 15 grams, highly gelled samples (unpourable) gave values in excess of 200 grams.

2. Cone penetrometer

Measurements have been made using the well-known (ASTM D2884-82) cone penetrometer test modified by using a smaller and heavier cone and the results considered in making evaluations.

3. Brookfield "Heliopath"

Attempts were made to use the Brookfield Heliopath attachment to measure gel strength. The Heliopath attachment for the regular Brookfield viscometer consists of a T-bar measuring head and a motor driven device which slowly raises or lowers the measuring head. This arrangement allows the measurement of undisturbed slurry. This system was not very satisfactory since most of the gels had viscosity gradients. Generally the gel is much more fluid near the top of the container than it is towards the bottom of the sample.

An easy and practical test for gel strength is a "pour test". If the undisturbed slurry pours out of the jar when it is inverted, it is likely that the gel is not so strong that tank car unloading would be a problem. The test can be made semiquantitative by measuring the percent remaining in the jar after a fixed drainage time.

EXAMPLES

Typical procedures for preparing cationically bulked kaolin clays with polyamines and quaternary ammonium salts are described in U.S. Pat. Nos. 4,075,030, 4,076,548 and 4,078,941, the teachings of which are incorporated by cross-reference. Specific examples of preparing cationically bulked clays with cationic polyelectrolytes such as Calgon 261 LV polymer are described in EPA 86305151.2 filed July 2, 1986, and pending U.S. application No. 06/861,943, filed May 12, 1986, the entire contents of which are incorporated herein by cross-reference.

Test evaluations described below were carried out with samples of Georgia kaolin clay bulked with Calgon 261 LV.

In some cases the quantity of residual soluble salts remaining in the filter cake was varied. The following is typical of the procedures used to prepare the bulked clay prior to addition of dispersant referred to as a "blocking agent" in some instances to make reference to the new function when used with cationically bulked clay.

A high purity kaolin crude clay from a deposit in Washington County, Georgia, known as North Jenkins crude, was degritted, dispersed in water sodium silicate having a $Na_2O/SiO_2$ weight ratio of about 3/1 and sodium carbonate. The suspension was then fractioned in a centrifuge to 87% finer than 2 micrometers. The median size of the fractionated suspensions was 0.59±0.03 micrometers; weight percentage finer than 0.3 micrometers was 17%. Solids were about 20% and pH about 7. The suspension was then passed through a high intensity magnetic separator magnet for purification. Calgon 261 LV polymer was added to the suspension of purified clay at the 0.08% level based on dry weight of clay. The polyelectrolyte was added as an aqueous solution of about 2% (wt.) concentration. The pH was adjusted to about 4 to 4.5 by addition of sulfuric acid and the sodium hydrosulfite ($Na_2S_2O_4$) bleach was added in amount of 6#/ton of clay.

The slurry was then filtered on a rotary vacuum filter to produce a filter cake having 55-60% solids. The filter cake was throughly washed with cold water and dispersed by adding with various dispersing agents, described in the tables followed by kneading. The pH of the fluidized cake wa adjusted to 6.5-7.0 by addition of sodium hydroxide. The suspension was then dried by spray drying.

Tests carried out to identify materials capable of maintaining low viscosity on storage and to elevate the thermal thickening temperature are described in the illustrative examples. These tests were carried out with a filter cake obtained by bulking a kaolin clay with Calgon 261 LV polymer. Initially a screening test was carried out in which agents were added to slurries dispersed with Mayosperse 148D (sodium polyacrylate). Tests results on the effect of various anionic sulfonate blocking agents on thermal thickening temperature are shown in Table 1. From Table 1 it can be seen that anionic compounds affected the thermal thickening temperature markedly. The best of those tested increased the temperature by 46° C., while the worst of those tested actually lowered this temperature by 14°.

Tamol 850 (an anionic sodium salt of polymethacrylic acid, mol. wt. of about 12,000) was found to be effective in raising the thermal thickening temperature and therefore, it was further tested as to its influence on other properties. Unfortunately, the more extensive testing did not show the Tamol 850 to be consistently effective nor as good as other materials subsequently evaluated. Data for Mayosperse 148D and Tamol 850 showed that the Tamol 850 is roughly equivalent to Mayosperse 148D in obtaining low viscosity but it obtains this low viscosity only over a narrow range of dispersant concentration. Scattering power at 577 nm as measured by black glass drawdowns was evaluated. It was found that as dispersant level is increased with either dispersant, scattering power was decreased. It was found that Tamol 850 reduces scattering more than does Mayospere 148D.

Samples of both the Mayospere 148D and Tamol 850 dispersed samples were tested for viscosity stability using the accelerated 140° F. aging test. These data show that Tamol 850 does not significantly increase thermal stability over that obtained by the use of Mayosperse 148D polyacrylate dispersant. Blends of this dispersant, hereinafter "M148D", with Tamol 850 do, however, increase thermal thickening temperature and viscosity stability to some extent.

Data in Table 1 show that LIGNOSITE 458 and DYQEX lignosulfonate were effective in raising the thermal thickening temperature. Both compounds are approved by the FDA for use in packaging materials in contact with food. Data in Table 3 give test results on combinations of these lignin sulfonates with M148D. Note that this study was carried out with filter cakes with a pH of about 4 and a low specific resistance of 6,500 ohms indicating a relatively high level of soluble salts. From this table it can be readily seen that the lignin sulfonates added at the 0.05% and 0.10% levels gave low initial viscosity and raised the thermal thickening temperature while maintaining good scattering power. When subjected to the accelerated aging test at 140° F., all of the samples containing these lignin sulfonates gave improved viscosity stability and resistance to gelling as compared to the sample dispersed with M148D alone. (Table 4). At the end of 6.8 days aging, the sample dispersed with M148D alone had gelled sufficiently so that a cone penetrometer reading could be taken. The samples with the sulfonates showed no gel formation but did give a soft sediment that contained about 10% of the total clay.

The result of a separate study using DYQEX lignin sulfonate with M148D are shown in Table 5. Again, lignin sulfonate addition raised the thermal thickening temperature and decreased the amount of gelling in the accelerated aging test. The effect of DYQEX dispersant addition in this study was not as great as in the study summarized in Tables 3 & 4, probably because the filter cake used in this test had a lower soluble salt content as measured by its specific resistance. Graphs plotting Brookfield viscosity as a function of aging time showed that addition of this lignin sulfonate kept overall viscosity lower as well as inhibiting gel formation.

As shown in Table LOMAR D (naphthalene formaldehyde sulfonate complex) was effective in raising the thermal thickening temperature by 46° C. when used in conjunction with M148D. Note that this result was obtained on the low specific resistance "aged" filter cake. It appears that scattering was reduced somewhat by additions of LOMAR D but was still met a desired value at the 0.10% addition level. (See Table 2.)

Table 6 shows the results obtained in the accelerated aging test at 140° F. Addition of LOMAR D at 0.05% and 0.10% gave significantly improved viscosity stability. The term "Spec. Cond." in the tables mean "specific conductance"

A number of compounds similar to LOMAR D are commercially available and have an advantage over lignin sulfonate in that they are much less highly colored and should not have a material effect on brightness.

Although variations are shown in the present application, many modification and ramifications will occur to those skilled in the art upon reading of the present disclosure. For example, cationic material other than polymers can be used and the cationic material can be added to unbleached clay at an alkaline dispersion pH, at acid pH levels which are typically encountered in reductive bleaching, after the addition of the hydrosulfite and sulfuric acid bleaching reagents, to the repulped filter cake both in the presence or absence of deflocculating agents, etc. Furthermore, the use of diallyl homopolymers has been described. Those skilled in the art will recognize that the polymer can be modified by introducing other momomers during the polymerization so as to modify the diallyl ammonium polymer salt.

TABLE 1

ANIONIC BLOCKING AGENTS
Effect on thermal thickening temperature.

| Clay used | Compound | % | Thickening temp. - deg. C. Control | Experiment | Change |
|---|---|---|---|---|---|
| 1 | Sodium citrate | 0.016 | 69 | 63 | −6 |
|  |  | 0.038 | 69 | 55 | −14 |
|  | Sodium polyacrylate | 0.014 | 69 | 63 | −3 |
|  |  | 0.034 | 69 | 67 | −2 |
|  | Sodium diglycolate | 0.019 | 69 | 66 | −3 |
| 5 | Sodium laurate | 0.05 | 60 | 60 | 0 |
| 4 | Tamol 850 (Note 1) | 0.05 | 60 | 93 | +33 |
|  |  | 0.10 | 60 | 85 | +25 |
|  |  | 0.05 | 60 | 67 | +7 |
| 6 | DYQEX | 0.05 | 82 | 100 | +18 |
|  |  | 0.10 | 82 | 100 | +18 |
| 7 | LIGNOSITE 458 | 0.05 | 82 | 98 | +16 |
|  |  | 0.10 | 82 | 95 | +13 |
|  |  | 0.05 | 82 | 100 | +18 |
|  |  | 0.10 | 82 | 100 | +18 |
| 6 | LOMAR D | 0.05 | 54 | 100 | +46 |
|  |  | 0.10 | 54 | 100 | +46 |
| 5 | Na dodecyl benz. sulfonate | 0.05 | 60 | 77 | +17 |
|  |  | 0.10 | 60 | 93 | +33 |
|  | Na dodecyl sulfate | 0.05 | 60 | 60 | 0 |
|  |  | 0.10 | 60 | 66 | +6 |
|  | disodium benz. sulfonate | 0.05 |  | (Note 2) |  |
|  | Tamol 960 (Note 3) | 0.05 | 60 | 65 | +5 |
|  |  | 0.10 | 60 | 61 | +1 |
|  | Tamol 963 (Note 4) | 0.05 | 60 | 66 | +6 |
|  | CMC (Hercules 7H) | 0.015 | 68 | 67 | −1 |
|  |  | 0.025 | 68 | 65 | −3 |

Key to clays used:
1. J2 filter cake + 0.15% M148D + 0.10% DA630
2. J2 filter cake + 0.15% M148D
3. J2 filter cake washed to >50,000 ohms + 0.15% M148D
4. J2 filter cake, 6,400 ohms + 0.15% M148D
5. J2 filter cake, 13,200 ohms + 0.15% M148D
6. K2 filter cake, "aged", 6,000 ohms, pH = 4, + 0.20% M148D
7. K1 filter cake, 16,000 ohms, + 0.20% M148D Notes:
1. Sodium polymethacrylate, 12,000 mol. wt.
2. Too viscous to measure.
3. Sodium polymethacrylate, 4,200 mol. wt.
4. Ammonium poly(meth)acrylate.

TABLE 2

ANIONIC BLOCKING AGENTS
Initial test results (before ageing) summary

| Clay used | Compound | % Added | pH | Spec. cond. | Brookfield 20 RPM | Brookfield 100 RPM | Herc. dynes/RPM | Thick. temp. | Black glass Gloss | Black glass S457 | Black glass S577 |
|---|---|---|---|---|---|---|---|---|---|---|---|
| 1 | Control | 0 | 6.5 | 667 | 94 | 120 | 16/425 | 69 | — | — | — |
| 1 | Sodium citrate | 0.016 | 6.14 | 735 | 90 | 123 | 16/430 | 63 | — | — | — |
| 1 |  | 0.038 | 5.70 | 763 | 196 | 197 | 16/345 | 65 | — | — | — |
| 1 | Sodium polyacrylate | 0.014 | 6.10 | 741 | 104 | 129 | 16/425 | 62 | — | — | — |
| 1 |  | 0.014 | 6.57 | — | — | — | — | 66 | — | — | — |
| 1 |  | 0.034 | 6.10 | 752 | 104 | 129 | 16/420 | 65 | — | — | — |
| 1 |  | 0.034 | 6.58 | — | — | — | — | 67 | — | — | — |
| 1 | Sodium diglycolate | 0.019 | 5.84 | 746 | 212 | 200 | 16/320 | 55 | — | — | — |
| 2 | Control | 0 | 6.54 | 729 | 108 | 130 | 16/415 | 63 | — | — | — |
| 2 | Sodium polyacrylate | 0.014 | 5.95 | 685 | 104 | 135 | 16/350 | 54 | — | — | — |
| 2 |  | 0.014 | 6.50 | — | — | — | — | 65 | — | — | — |
| 2 |  | 0.034 | 5.70 | 714 | 130 | 162 | 16/310 | 51 | — | — | — |
| 2 |  | 0.034 | 6.50 | — | — | — | — | 65 | — | — | — |
| 3 | Control | 0 | 6.63 | 493 | 92 | 118 | 16/400 | 75 | — | — | — |
| 3 | Sodium polyacrylate | 0.014 | 6.04 | 465 | — | — | 16/440 | — | — | — | — |
| 3 |  | 0.014 | 6.50 | 483 | 88 | 116 | 16/440 | 74 | — | — | — |
| 3 |  | 0.034 | 6.00 | 463 | — | — | — | — | — | — | — |
| 3 |  | 0.034 | 6.50 | 562 | 84 | 115 | 16/500 | 71 | — | — | — |
| 5 | Control | 0 | 6.67 | 725 | 132 | 161 | 16/375 | — | — | — | — |
| 5 | Sodium laurate | 0.05 | 6.67 | 750 | 126 | 144 | 16/550 | — | — | — | — |
| 5 | Tamol 850 | 0.05 | 6.86 | 858 | 222 | 159 | 16/700 | — | — | — | — |
| 4 | Control | 0 | 6.60 | 822 | 148 | 162 | 16/400 | — | — | — | — |
| 4 | Tamol 850 | 0.05 | 6.90 | 967 | 112 | 128 | 16/665 | — | — | — | — |
| 4 |  | 0.10 | 7.09 | 1057 | 300 | 170 | 16/700 | — | — | — | — |
| 6 | Control | 0 | 6.46 | 995 | 72 | 106 | — | — | 54 | 181 | 134 |
| 6 | DYQEX | 0.05 | 6.39 | 1070 | 72 | 100 | — | — | 58 | 184 | 133 |
| 6 |  | 0.10 | 6.39 | 1139 | 56 | 88 | — | — | 61 | 176 | 127 |
| 6 | LIGNOSITE 458 | 0.05 | 6.43 | 1079 | 74 | 104 | — | — | 60 | 178 | 128 |
| 6 |  | 0.10 | 6.48 | 1100 | 54 | 87 | — | — | 59 | 180 | 125 |
| 7 | Control | 0 | 7.5 | — | 75 | 77 | 8/1100 | 82 |  |  |  |
| 7 | DYQEX | 0.05 | 7.5 | — | 120 | 110 | 3/1100 | 98 |  |  |  |
| 7 |  | 0.10 | 7.5 | — | 90 | 86 | 2/1100 | 95 |  |  |  |
| 9 | Control | 0 | 5.40 | 922 | 560+ | 280+ | — | — | — | — | — |
| 9 | DYQEX | 0.05 | 5.44 | 983 | 102+ | 112 | — | — | — | — | — |
| 9 |  | 0.10 | 5.47 | 1040 | 74+ | 96 | — | — | — | — | — |
| 9 | LIGNOSITE 458 | 0.05 | 5.52 | 969 | 92+ | 94 | — | — | — | — | — |
| 9 |  | 0.10 | 5.50 | 1030 | 76+ | 96 | — | — | — | — | — |
| 6 | Control | 0 | 6.30 | 1019 | 116 | 135 | — | 54 | 39 | 195 | 144 |
| 6 | LOMAR D | 0.05 | 6.40 | 1090 | 68 | 96 | — | 100 | 55 | 176 | 125 |
| 6 |  | 0.10 | 6.40 | 1182 | 52 | 84 | — | 100 | 62 | 160 | 115 |
| 5 | Control | 0 | 6.50 | 725 | 132 | 161 | 16/375 | 60 | — | — | — |
| 5 | Na dodecyl benzene sulfonate | 0.05 | 6.60 | 854 | 82 | 110 | 16/635 | 77 | — | — | — |
| 5 |  | 0.10 | 6.60 | 934 | 80 | 109 | 16/800 | 93 | — | — | — |
| 5 | Na dodecyl sulfate | 0.05 | 6.64 | 773 | 122 | 148 | 16/410 | 60 | — | — | — |
| 5 |  | 0.10 | 6.69 | 832 | 84 | 112 | 16/690 | 66 | — | — | — |
| 5 | Na2 benz. disulfonate | 0.05 | 6.50 | 967 | 1050+ | 590+ | 16/245 | — | — | — | — |
| 5 | Tamol 960 | 0.05 | 6.87 | 878 | 138 | 139 | 16/485 | 65 | — | — | — |
| 5 |  | 0.10 | 7.01 | 981 | 500+ | 308 | 16/500 | 61 | — | — | — |
| 5 | Tamol 963 | 0.05 | 6.80 | 905 | 200 | 184 | 16/455 | 66 | — | — | — |

Key to clays used:
1. J2 filter cake + 0.15% M148D + 0.10% DA630
2. J2 filter cake + 0.15% M148D
3. J2 filter cake washed to >50,000 ohms + 0.15% M148D
4. J2 filter cake, 6,400 ohms + 0.15% M148D
5. J2 filter cake, 13,200 ohms + 0.15% M148D
6. K2 filter cake, "aged", 6,000 ohms, pH = 4, + 0.21% M148D
7. K2 filter cake, 16,000 ohms, + 0.20% M148D
9. Same as "6" but 0.15% M148D

TABLE 3

ANIONIC SULFONATE AS ADDITIVE FOR CATIONICALLY BULKED KAOLIN
Additions to 2588K2 "aged" filter cake. pH = 4, 6,500 ohms (10% sol.)

| Sample | pH | Spec. Cond. | Brookfield 20 RPM | Brookfield 100 RPM | Therm. Thick. —C | Black glass Gloss | Black glass S457 | Black glass S577 |
|---|---|---|---|---|---|---|---|---|
| 0.15% M148D | 5.40 | 922 | 560+ | 280+ | — | — | — | — |
| 0.20% M148D | 6.46 | 995 | 72 | 106 | 82 | 57 | 184 | 134 |
| 0.25% M148D | 6.70 | 1149 | 100+ | 75 | 50 | — | — | — |
| 0.30% M148D | 7.12 | 1329 | 120+ | 84 | 48 | — | — | — |
| .15 M148D+.05 DYQEX | 5.44 | 983 | 102+ | 112 | — | — | — | — |
| .20 M148D+.05 " | 6.39 | 1070 | 72 | 100 | 100 | 58 | 184 | 138 |
| .15 M148D+.10 " | 5.47 | 1040 | 74+ | 96 | — | — | — | — |
| .20 M148D+.10 " | 6.39 | 1139 | 56 | 88 | 100 | 62 | 176 | 123 |
| .15 M148D+.05 LIGNOSITE 458 | 5.52 | 969 | 92+ | 94 | — | — | — | — |

TABLE 3-continued

ANIONIC SULFONATE AS ADDITIVE FOR CATIONICALLY BULKED KAOLIN

Additions to 2588K2 "aged" filter cake. pH = 4, 6,500 ohms (10% sol.)

| Sample | pH | Spec. Cond. | Brookfield 20 RPM | Brookfield 100 RPM | Therm. Thick. —C | Gloss | Black glass S457 | S577 |
|---|---|---|---|---|---|---|---|---|
| .20 M148D+.05 " | 6.43 | 1079 | 74 | 104 | 100 | 60 | 178 | 128 |
| .15 M148D+.10 " | 5.50 | — | — | | | | | |
| .20 M148D+.10 " | 6.48 | 1100 | 54 | 87 | 100 | 59 | 180 | 125 |

TABLE 4

ANIONIC SULFONATE AS ADDITIVE FOR CATIONICALLY BULKED KAOLIN

Additions to "aged" filter cake. pH = 4, 6,500 ohms @ 10% sol.
Ageing tests at 140 F.

| Sample | 0.20% M148D | 0.20% M148D 0.5% DYQEX | 0.20% M148D .10% DYQEX | 0.20% M14BD 458 0.5% LIGNOSITE | 0.20% M14BD 458 .10% LIGNOSITE |
|---|---|---|---|---|---|
| Initial values. | | | | | |
| pH | 6.46 | 6.39 | 6.39 | 6.43 | 6.48 |
| Spec. cond. | 995 | 1070 | 1139 | 1079 | 1100 |
| Brookfield | | | | | |
| 20 RPM | 72 | 72 | 56 | 74 | 54 |
| 100 RPM | 106 | 100 | 88 | 104 | 87 |
| Aged 6.8 days. (See note.) | | | | | |
| pH | 5.9 | 5.76 | 5.69 | 5.84 | 5.72 |
| Spec. cond. | 1010 | 1085 | 1159 | 1083 | 1130 |
| Brookfield | | | | | |
| 20 RPM | 210+ | 62 | 56 | 60 | 56 |
| 100 RPM | 158 | 88 | 80 | 84 | 78 |
| Aged 11.5 days. | | | | | |
| pH | 6.00 | 5.86 | 5.79 | 5.79 | 5.80 |
| Spec. cond. | 1003 | 1104 | 1177 | 1109 | 1169 |
| Brookfield | | | | | |
| 20 RPM | 224+ | 70+ | 72+ | 68+ | 66+ |
| 100 RPM | 164 | 87 | 81 | 84 | 78 |
| Aged 18.2 days. | | | | | |
| pH | 5.90 | 5.82 | 5.81 | 5.82 | 5.83 |
| Spec. cond. | 961 | 1019 | 1089 | 1010 | 1089 |
| Brookfield | | | | | |
| 20 RPM | 150+ | 80+ | 70+ | 62+ | 62+ |
| 100 RPM | 126 | 89 | 81 | 82 | 78 |

Note:
After ageing 6.8 days, the sample dispersed with M148D alone gave sufficient gel formation for a penetrometer reading (17.9 mm), the other samples showed no gel formation but some soft sediment.

TABLE 5

ANIONIC SULFONATE AS ADDITIVE FOR CATIONICALLY BULKED KAOLIN

Filter cake, pH = 4.3, res. = 16,100 ohms at 10% sol. Ageing at 140 F.
M148D added to pH = 7.5

| Days | Brookfield 20 RPM | Brookfield 100 RPM | pH | Spec. cond. | Therm. thick. | Herc. dyne/RPM | Gel? | Pour? | Sed.? |
|---|---|---|---|---|---|---|---|---|---|
| Control: 0.00% DYQEX | | | | | | | | | |
| 0 | 75 | 77 | 7.5 | | 82 | 8/1100 | no | yes | no |
| 1 | 142 | 134 | 7.1 | 1169 | | 6/1100 | very slight | yes | very slight |
| 3 | 155 | 145 | 7.1 | 1117 | | 6/1100 | slight | yes | slight (soft) |
| 7 | 160 | 152 | 7.1 | 1229 | | 7/1100 | yes | yes | yes (hard) |
| +0.05% DYQEX | | | | | | | | | |
| 0 | 120 | 110 | 7.5 | | 98 | 3/1100 | no | yes | no |
| 1 | 155 | 135 | 7.1 | 1236 | | 2/1100 | very slight | yes | very slight |
| 3 | 135 | 131 | 7.1 | 1192 | | 3/1100 | very slight | yes | slight |
| 7 | 145 | 134 | 7.1 | 1252 | | 3/1100 | slight | yes | some (hard) |
| +0.10% DYQEX | | | | | | | | | |
| 0 | 90 | 86 | 7.5 | | 95 | 8/1100 | no | yes | no |
| 1 | 120 | 113 | 7.1 | 1287 | | 2/1100 | very slight | yes | no |
| 3 | 120 | 117 | 7.1 | 1202 | | 2/1100 | very slight | yes | slight |
| 7 | 109 | 106 | 7.1 | 1256 | | 5/1100 | very slight | yes | some (hard) |

TABLE 6
ANIONIC SULFONATE AS ADDITIVE FOR CATIONICALLY BULKED KAOLIN

Additions to "aged" K2 filter cake. pH = 4,
spec. res. = 6,500 ohms at 10% sol., ageing at 140 F.

| Dispersant | pH | Spec. cond. | Brookfield 20 RPM | Brookfield 100 RPM | Thick. temp. | Black glass Gloss | S457 | S577 |
|---|---|---|---|---|---|---|---|---|
| *Initial test results* | | | | | | | | |
| 0.20% M148D | 6.3 | 1019 | 116 | 135 | 54 | 39 | 195 | 144 |
| 0.25% M148D | 6.8 | 1151 | 84 | 107 | 63 | 45 | 188 | 137 |
| 0.30% M148D | 7.4 | 1345 | 120+ | 122 | 60 | 46 | 180 | 136 |
| 0.20% M148D + .05% LOMAR D | 6.4 | 1090 | 68 | 96 | 100 | 55 | 176 | 125 |
| 0.20% M148D + .10% LOMAR D | 6.4 | 1182 | 52 | 84 | 100 | 62 | 160 | 115 |
| *Aged 4.8 days* | | | | | | | | |
| 0.20% M148D | 6.2 | 1070 | 14000+ | | | | | |
| 0.25% M148D | 6.6 | 1206 | 3000+ | 1300+ | | | | |
| 0.30% M148D | 7.0 | 1360 | 1200+ | 650+ | | | | |
| 0.20% M148D + .05% LOMAR D | 6.1 | 1187 | 46 | 78 | | | | |
| 0.20% M148D + .10% LOMAR D | 6.1 | 1188 | 56 | 87 | | | | |
| *Aged 11.8 days* | | | | | | | | |
| 0.20% M148D | 6.1 | 1013 | 640+ | 338 | | | | |
| 0.25% M148D | 6.6 | 1100 | 280+ | 220 | | | | |
| 0.30% M148D | 7.0 | 1280 | 240+ | 198 | | | | |
| 0.20% M148D + .05% LOMAR D | 6.1 | 1087 | 70 | 89 | | | | |
| 0.20% M148D + .10% LOMAR D | 6.2 | 1153 | 68 | 89 | | | | |

At 11.8 days the three samples with M148D only were gelled sufficiently to give penetrometer readings. Both R1094-87 samples had 10 to 20% sediment but no gel formation.

I claim:

1. A heat stabilized fluid aqueous slurry comprising chemically bulked hydrous kaolin clay pigment particles obtained by adding a cationic organic polymeric material to hydrous kaolin clay in the presence of water to flocculate said clay and a dispersant effective amount of a combination of dispersants consisting essentially of a polyacrylate salt and a water soluble anionic sulfonate, said slurry having greater heat stability than it would have using said polyacrylate salt as the sole dispersant.

2. The slurry of claim 1 wherein said pigment is obtained by flocculating a suspension of kaolin with a cationic polyelectrlyte.

3. The slurry of claim 1 wherein said pigment is obtained by flocculating a suspension of kaolin clay with a polyamine.

4. The pigment of claim 2 wherein said slurry is at 60% solids or above.

5. A method for preparing a heat stable aqueous slurry of a bulking pigment suitable for use in coating or filling paper which comprises preparing a fluid aqueous suspension of particles of kaolin clay, adding thereto a water-soluble cationic organic polyelectrolyte, the amount of said cationic polyelectrolyte being sufficient to substantially thicken and flocculate said clay suspension, acidifying said clay suspension, optionally bleaching the clay in said suspension with a hydrosulfite salt before or after said acidification, filtering said acidified suspension to recover bulked clay, washing the filtered clay and adding a dispersant effective amount of a dispersant consisting essentially of the combination of a polyacrylate salt and a water soluble anionic sulfonate to the recovered bulked clay to provide said heat stable fluid slurry of bulked clay.

6. The method of claim 5 wherein said anionic sulfonate is a lignosulfonate.

7. The method of claim 5 wherein said anionic sulfonate is a napthalene formaldehyde sulfonate complex.

8. The method as claimed in claims 6 or 7 wherein said anionic sulfonate is present in an amount in the range of about 0.05 to 0.25 based on the dry weight of said clay including said cationic polyelectrolyte.

9. The method as claimed in claim 6 or 7 wherein said surfactant is present in amount in the range of about 0.1 to 15% based on said clay including said cationic polyelectrolyte.

10. In the preparation of a starch coating color suitable for application to paper wherein the pigment comprises kaolin clay previously bulked with a cationic organic agent and the coating color is prepared by cooking starch in the presence of a slurry comprising said bulked clay and a dispersant to form a fluid slurry, the improvement which comprises utilizes as said dispersant the combination consisting essentially of a polyacrylate salt and a water soluble anionic sulfonate in an amount effective to minimize the increase in viscosity when said coating color is cooked.

* * * * *